United States Patent [19]

Schad

[11] Patent Number: 4,634,088
[45] Date of Patent: Jan. 6, 1987

[54] SUSPENSION ELEMENT FOR THE EXHAUST SYSTEM OF A MOTOR VEHICLE ENGINE

[75] Inventor: Kurt Schad, Bischofsheim, Fed. Rep. of Germany

[73] Assignee: General Motors Corporation, Detroit, Mich.

[21] Appl. No.: 707,392

[22] Filed: Mar. 1, 1985

[51] Int. Cl.$^4$ .............................................. F16L 3/00
[52] U.S. Cl. ..................................... 248/60; 248/613; 267/141; 188/268
[58] Field of Search ................. 248/60, 560, 562, 564, 248/589, 610–613, 58, 62, 317, 339; 267/141, 63 R, 153; 188/268; 180/89.2, 296, 309

[56] References Cited

U.S. PATENT DOCUMENTS

| 1,779,663 | 10/1930 | Cowell | 267/63 R |
|---|---|---|---|
| 1,850,289 | 3/1932 | Saurer | 267/141 |
| 3,690,540 | 9/1972 | Hardigg | 267/141 |
| 4,116,411 | 9/1978 | Masuda | 248/60 |
| 4,465,252 | 8/1984 | Donovan | 248/589 |

FOREIGN PATENT DOCUMENTS

| 555577 | 3/1957 | Belgium | 267/141 |
|---|---|---|---|
| 567831 | 6/1958 | Belgium | 267/141 |
| 2206750 | 8/1973 | Fed. Rep. of Germany | 248/60 |
| 3137746 | 6/1983 | Fed. Rep. of Germany . | |
| 1207269 | 4/1959 | France | 267/141 |
| 131845 | 7/1978 | German Democratic Rep. | 248/60 |
| 628896 | 11/1961 | Italy | 267/141 |

Primary Examiner—J. Franklin Foss
Assistant Examiner—Robert A. Olson
Attorney, Agent, or Firm—R. L. Phillips

[57] ABSTRACT

A suspension element for the exhaust system components of an internal combustion engine incorporates interengaging resilient rings. However, these rings are not in direct contact with one another. Instead, they extend about an elastic, air-filled spherical member. This spherical member provides for the vibrations generated by the exhaust system being effectively attenuated by the suspension element before being transmitted to the floor of the motor vehicle.

1 Claim, 6 Drawing Figures

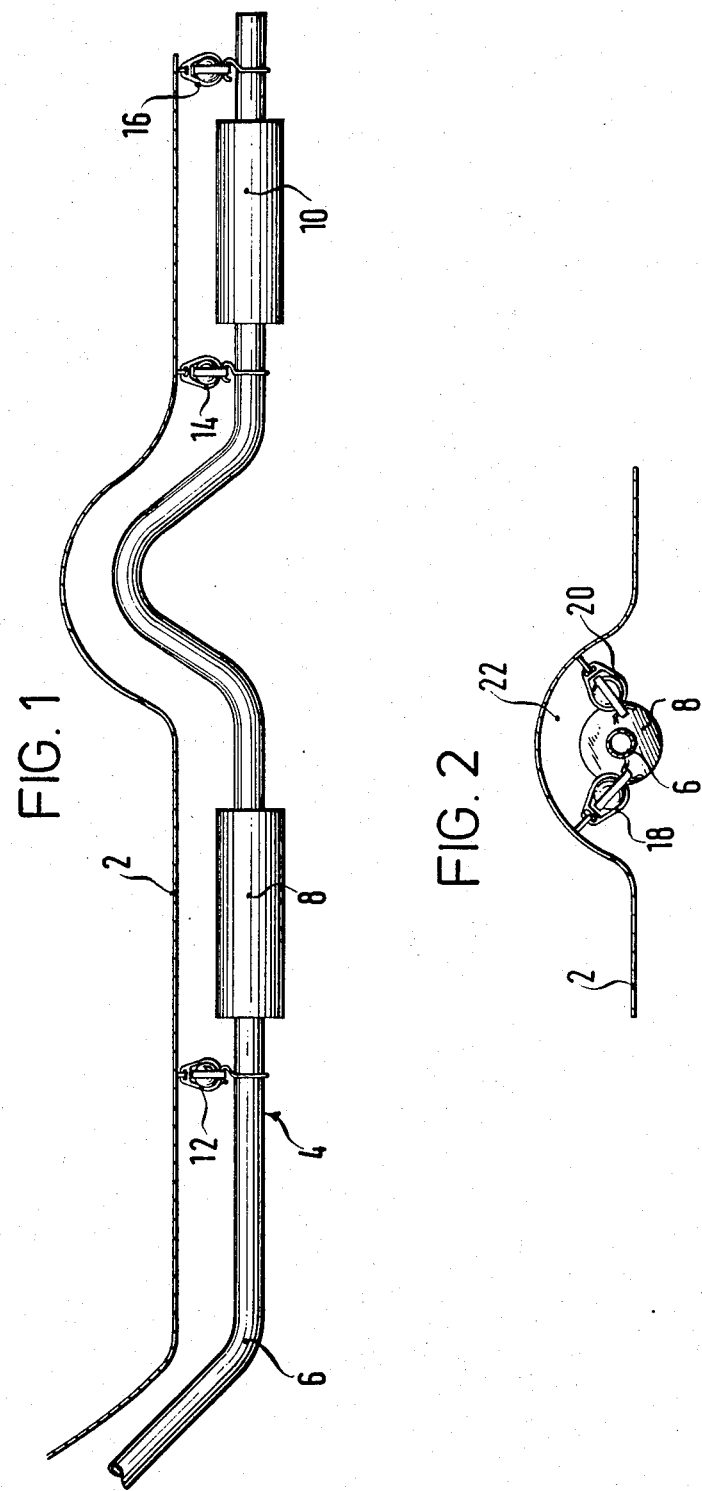

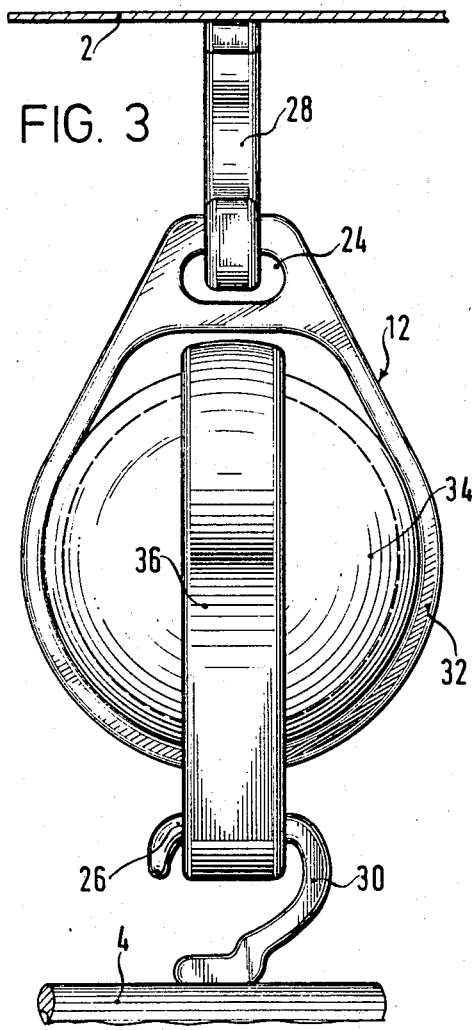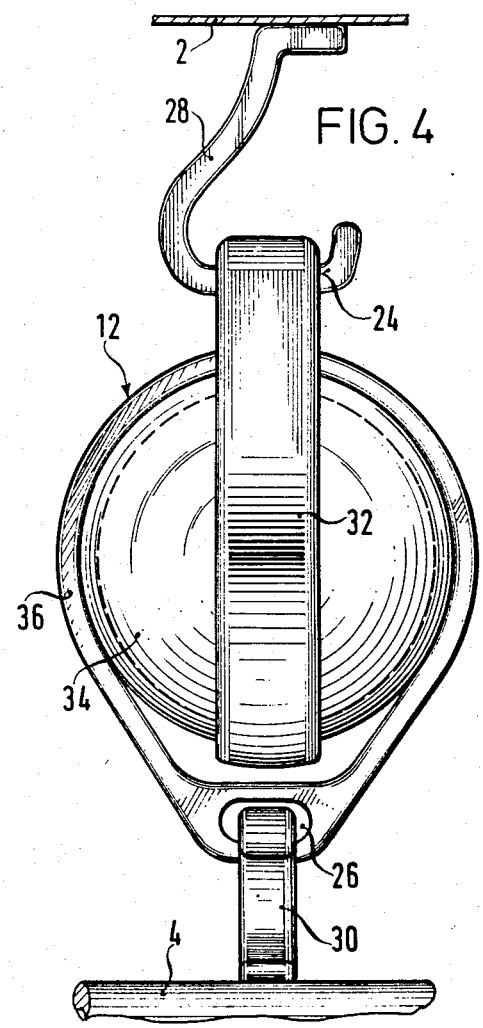

SUSPENSION ELEMENT FOR THE EXHAUST SYSTEM OF A MOTOR VEHICLE ENGINE

TECHNICAL FIELD

The invention relates to a suspension element for the exhaust system of a motor vehicle engine and, more particularly, to a suspension element provided with vibration absorbing means.

BACKGROUND OF THE INVENTION

Motor vehicle exhaust system components are supported on the vehicle substructure by suspension elements such as elastic rings in order to reduce to a minimum the level of engine vibrations that find their way into the vehicle floor and the vehicle interior by way of the exhaust system. In order to isolate the exhaust system vibrationally as much as possible from the vehicle floor, the elastic rings must, of necessity, exhibit a relatively high degree of elasticity. On the other hand, because of their considerable weight, exhaust systems must be secured to the vehicle floor in a relatively rigid manner, for if the excursions of the mounting elements are too great, the exhaust conduits may be caused to strike against the floor or other vehicle components.

The arrangement disclosed in German publication DE-OS No. 31 37 746 is an attempt to reconcile these conflicting objectives in that an intermediate mass is provided which is disposed in each of the elastic elements. This intermediate mass is adapted to oscillate in the resonance range in the opposite sense of the exhaust system. The advantage of this arrangement is that it provides a cancelling effect in the resonance range, but outside of the resonance range the phase shift will move towards zero and, instead of absorbing the vibrations, the arrangement will cause an amplitude addition. Since the resonance range covers only a small portion of the entire frequency range which is encountered, the noise level in the passenger compartment, instead of being decreased, is being raised over a substantial portion of the engine speed range.

SUMMARY OF THE INVENTION

It is the object of the present invention to develop a suspension element of the type described in the foregoing which will transmit, over a relatively wide frequency range, only a minimum of oscillations from the exhaust system to the vehicle floor.

This object is accomplished in accordance with the present invention in a surprisingly simple manner by the provision of a low-mass, air-filled vibration absorbing element.

The vibration absorbing element according to the present invention functions in a fundamentally different manner than the one incorporating an intermediate mass described in the aforementioned German publication DE-OS No. 31 37 746. By virtue of its low-mass configuration, the vibration absorbing member according to the present invention does not oscillate with the suspension element in greater or lesser phase shift therewith, but remains in synchronism therewith. Because of the air contained therein, the device is capable of damping vibrations very effectively and assists in decoupling the vehicle floor from the exhaust system. Such a decoupling is, to a large extent, frequency-independent, and as a result, the noise level inside the vehicle is reduced over the entire engine speed range. Furthermore, the suspension element according to the present invention permits the support for the exhaust system to be sufficiently rigid so as to ensure that even relatively heavy exhaust system components are not caused to vibrate excessively when subjected to high acceleration forces, or are caused to strike against the vehicle floor structure or other vehicle components.

Although the vibration absorbing member is of a relatively simple design, it is extremely effective when in the form of a spherical member to which is fitted a pair of interengaging resilient rings, one of which is secured to the vehicle floor and the other to the exhaust gas conducting member.

Moreover, manufacturing costs are reduced to a considerable degree when the spherical member is made of an elastic foam material.

Alternatively, the vibration absorbing device may be in the form of a spherical member filled with air. A further embodiment of the present invention constitutes a kinematic reversal of the principle described in the foregoing. Unlike the arrangement incorporating a spherical member, the hollow body utilized in this arrangement is subjected to a tensile load imposed by the weight of the exhaust system. In addition, the hollow body mentioned becomes particularly simple in design when in the form of a cylindrical resilient element.

It will be understood then that the concept of the present invention permits a great variety of modifications. To convey the general concept of the invention, two exemplary embodiments will be described in the following in conjunction with the drawings, wherein:

FIG. 1 is a side elevation of a portion of a vehicle exhaust system incorporating the suspension elements according to the invention.

FIG. 2 are the suspension elements in accordance with the invention mounted inside the tunnel of a vehicle floor structure.

FIG. 3 is a suspension element according to the invention disposed between the vehicle floor and the exhaust system, and illustrated at an enlarged scale relative to FIGS. 1 and 2.

FIG. 4 is the suspension element according to FIG. 3, turned at an angle of 90° about the vertical axis.

Figure 5:
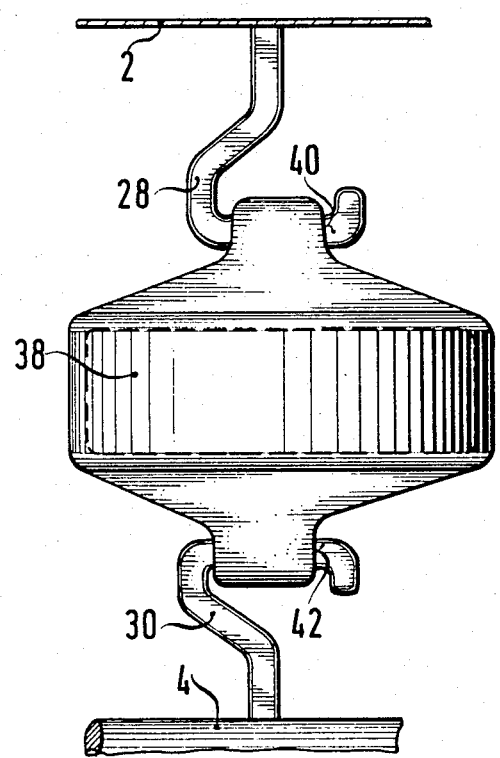
FIG. 5 is a second exemplary embodiment of a suspension element.

In FIG. 1, there is shown the floor 2 of a vehicle with an exhaust system 4 extending underneath thereof. As is typical, the exhaust system 4 includes an exhaust pipe 6 having incorporated therein a resonator 8 and a muffler 10. Suspension elements 12, 14, 16 which are the subject of the invention are provided for mounting the exhaust pipe 6 together with the resonator 8 and the muffler 10 to the underside of the vehicle floor. When the floor extends in a generally horizontal direction, as illustrated in FIG. 1, the exhaust system 4 may be retained in position by means of vertically oriented suspension elements 12, 14, 16.

FIG. 2 illustrates that when the exhaust pipe 6 extends inside a tunnel 22 of the floor 2, it may also be retained in position by means of two suspension elements 18, 20 arranged at an angle of, for instance, 120° relative to one another. This arrangement effectively prevents the exhaust pipe 6 or the resonator from striking against the tunnel wall.

It is apparent from FIGS. 3 and 4 that the suspension element 12 is, just like the other suspension elements, provided with mounting lugs 24, 26. A hook 28 which is fastened to the floor 2 is adapted to engage into the lug 24. Another hook 26, which is attached to the exhaust system 4, is adapted to engage into the lug 26. The lug 24 is an integral portion of an elastic ring 32 which is embracing a spherical member 34. In like fashion, lug 26 is also an integral portion of an elastic ring 36, which is embracing the spherical member 34. The rings 32 and 36 are oriented so as to extend around the spherical member at a 90° angle to one another.

The spherical member 34 may be made of an elastic foam material, or it may be in the form of a hollow body filled with air.

According to the present invention as incorporated in the suspension element 12, the elastic rings 32 and 36 are coupled only indirectly to one another; i.e. by way of the spherical member 34. This arrangement provides for the vibrations picked up by the elastic ring 36 from the exhaust system components being first attenuated to a considerable degree before being transmitted to the elastic ring 32, so that only a small amount of vibrations, if any, will be transmitted from the exhaust system 4 to the vehicle floor.

Figure 6:
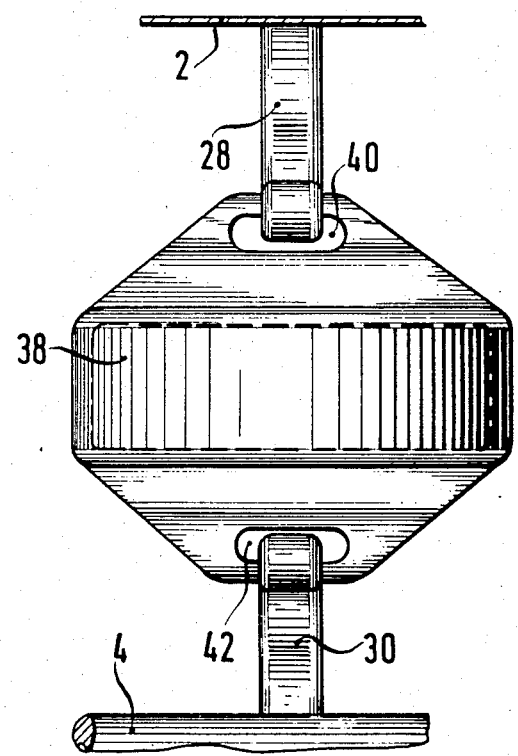
FIG. 6 is the suspension element according to FIG. 5, turned at an angle of 90° about the vertical axis.

In the embodiment illustrated in FIGS. 5 and 6, instead of the spherical member 34, an air-filled, air-tight hollow body 38 is provided which is similar to a resilient element and which is of circular cross-section. Each end face of the hollow body 38 is provided with lugs 40, 42, respectively and, like in the embodiment illustrated in FIGS. 3 and 4, hooks 28, 30 are provided which are adapted to engage, respectively, into the lugs 40, 42. The difference between this embodiment and the one described earlier is that the hollow body 38, unlike the spherical member 34, is subjected to a tensile load. Thus, the vibrations will cause a pressure rise or pressure drop inside the hollow body 38 which, in turn, will cause the desired attenuation of the vibrations to occur.

The embodiments of the invention in which an exclusive property or privilege is claimed are defined as follows:

1. In a motor vehicle having a floor with an exhaust system extending therebeneath, elastic air-filled suspension means for suspending said exhaust system from said floor while attenuating vibrations generated by said exhaust system prior to their transmission to said floor, said means comprising a pair of elastic rings that are linked together and adapted to be connected to said floor and exhaust system respectively, and an air-filled elastic sphere arranged between said rings at their linkage so as to provide an air cushion therebetween.

* * * * *